April 1, 1930.  F. O. CARLSON  1,752,730
TAG STRINGING MACHINE
Filed May 14, 1928   7 Sheets-Sheet 1

Inventor
Fritz O. Carlson
By Attorneys
Southgate Fay & Hersey

April 1, 1930.    F. O. CARLSON    1,752,730
TAG STRINGING MACHINE
Filed May 14, 1928    7 Sheets-Sheet 5

Inventor
Fritz O. Carlson
By Attorneys

Patented Apr. 1, 1930

1,752,730

UNITED STATES PATENT OFFICE

FRITZ O. CARLSON, OF WORCESTER, MASSACHUSETTS

TAG-STRINGING MACHINE

Application filed May 14, 1928. Serial No. 277,624.

This invention relates to a machine for passing a loop through the eye of a tag and bringing the ends through the loop, to provide the tag with a looped thread with the free ends extending therefrom.

The principal objects of the invention are to provide a machine of this character which will be practicable and will operate at a high speed, stringing one tag after another during the operation of the machine automatically; to provide a movable, preferably rotary, table for bringing the tags around to stringing position, one after the other, and then to position for delivery; to provide means for holding the string taut at the stringing station and means for cutting the string off to form uniform lengths thereof; to provide means for feeding the tags forward from the table, one at a time into position for stringing; to provide means whereby the string, after being cut, is formed into a loop; means for then spreading the loop below its supporting table; to provide means for receiving the spread loop on flaring surfaces and keeping it spread; to provide means for forming the loop in a simple and expeditious manner; to provide means for holding the ends of the string and bringing them through the loop; to provide means for then releasing the loop to allow the stringed tag to pass along with the rotary table to a position to be discharged and to provide a simple and durable mechanism consisting largely of stationary cams for controlling these various operations.

Other objects and advantages of the invention will appear hereinafter.

Reference is to be had to the accompanying drawings in which.

This machine comprises a stationary circular platform 10, supported on a base 11, and a rotary table 12 adapted to rotate about the axis of a standard 13 extending up from the base 11 and supporting the platform 10 and also by anti-friction bearings supporting the table 12. This table carries a gear 14 which is operated by a pinion on a shaft 15 which can be operated through a pulley 16 or in any desired way. This table is intended to rotate constantly during the operation of the machine.

The platform 10 has a cam groove 17 in which operates a roller 18 connected to the bottom of a slide 19 movable in radial guides 20 on the bottom of the table 12. Therefore, as the table 12 rotates the slide will move out of the position shown, once during each rotation, or it could be constructed to do the same thing on the opposite side.

The table 12 is shown as carrying seven tag hoppers 21. The tags are piled up in each of these hoppers and adapted to be fed out through the bottom by means of a pivoted finger 22 which, on the outward movement of the slide 19, catches under the wafer W which is mounted on each side of each tag T around the perforation therein. The finger 22 is held up yieldingly by a spring 24. Therefore the bottom tag T is pushed out to the position shown in Fig. 5. These label hoppers 21 are located in radial position and fastened down by clamps 23 on each side. Obviously they can be adjusted if necessary. It may be said at this point that the tags are fed through, one after the other, by reciprocation of this slide 19 and the pushing of one tag out of the machine by the next one being moved out by this finger 22.

The table 12 is of a general circular form and has a series of sector plates 25 around the circumference, seven in number, as shown, said plates constituting a complete circle. They are located in position to receive in their under cut surfaces the tags as they are discharged from the hoppers. The tags are held down on the table 12 by clamp rods 77 having spring 78 on a rod 81. They are raised periodically by rolls 80 engaging a fixed cam 79. Each plate has a steel jaw 26 on each end. The string is cut off by these two steel jaws by the motion of one of these segments 25 vertically to cut the string between these two blades. This action is caused by a cam 27 fixed on the platform.

The string is mounted in a circumferential groove 28 which is located in the edge of each of these segments which, as stated, constitute a complete circle. It is held taut by clips 29 on these segments 25. The clips are pressed down by springs 30 operated on by adjustable screws 31 to adjust the tension. Each segment has a recess 32 extending through the groove to leave the string unsupported at that point but, of course, held taut between the two clips 29, one on each side.

Figure 12:
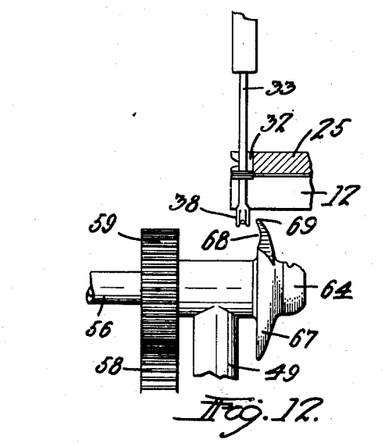
Fig. 12 is a side view showing the first operation in the manipulation of the string for forming the loop below the table.
Figure 13:
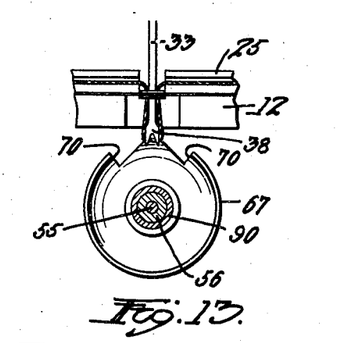
Fig. 13 is an end view of the same, partly in section.

The string can be forced down through the recess 32 by a bodkin 38 which is grooved in the end for that purpose and pushes the string a considerable distance down as will be seen from Fig. 12. This bodkin is mounted on a rod 33, having a spring 34 under its head normally holding it up as shown and forced down by a lever 35 pivoted on a standard 36 carried by the segment. The other end of this lever is forced up by a rod 36$^a$ having a head on the bottom which slides up on a stationary cam 37 located at the operating station in one place around the circumference and located so that the bodkin will move down at the right time and draw the string far enough to enable it to form a loop.

Figure 14:
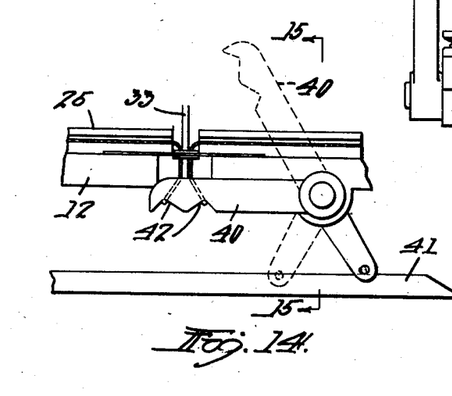
Fig. 14 is an end view like Fig. 6 on enlarged scale, showing only the string holding means and means for spreading the loop.
Figure 15:
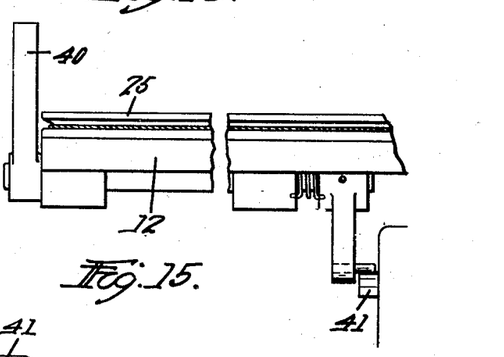
Fig. 15 is a side view of the same, partly in section, on the line 15—15 of Fig. 14.
Figure 17:
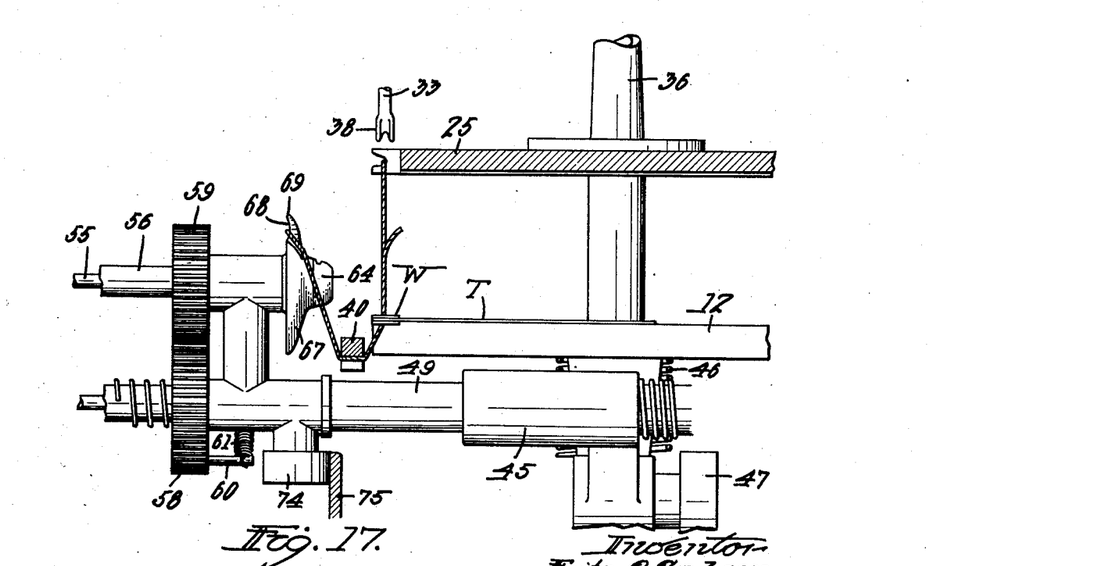
Fig. 17 is a similar view showing the position of the parts after the tag stringing parts have ascended and illustrating the next step in the operation.

For the purpose of spreading the loop of the thread, I provide a lever 40, one arm of which is engaged by a stationary cam 41 on the platform 10 as the table moves around clockwise. In the long arm are two notches 42 separated by a wide space and having inclined edges. This lever is rocked down into position for engaging the loop and forcing the two strands of it into the two notches 42 and thus separating them enough for the next action, as shown in Fig. 14. This occurs after the loop is drawn slightly to the left as shown in Fig. 17.

Carried depending from the table 12 is a vertically movable frame 45 which has a passage therethrough for the rod 36$^a$ but is movable vertically independent of it. This frame 45 is held down by a spring 46 and is provided with a roller 47 adapted to engage a fixed cam 48 during the rotation of the table to lift the roll and frame in opposition to the spring 46. At other times it stays in its lowermost position.

This frame has a horizontal telescoping slide 49 carrying a slidable tube and a horizontal rod 51 telescopes within that. This rod has a spring 52 which presses it inwardly and a head 53 which engages a cam 53$^a$ and forces the rod out at a predetermined time. This rod has on the opposite end an arm 54. The opposite ends of this arm are shown in the form of split bearings, one secured to the rod 51 and the other secured to a rod 55 parallel with it. The rod 55 passes through a tube 56 which, by means of an arm 57 is similarly secured to the tube 50. The tube 56 is carried slidably in a tube 90 having a bearing on the slide 49. On the tubes 50 and 90 are a pair of gears or gear segments 58 and 59. The gear 59 is secured to the tube 90 by a screw while the gear 58 is loose on its tubular shaft. This gear 58 is provided with a pin 60 fixed to it and a spring 61 which is connected with the frame.

A fixed cam 62 lies in the path of this pin and when the pin engages it, during the rotation of the table, the gear 58 will be turned until the pin passes over the cam and this, of course, turns the shaft 56. The spring then returns the gears against a stop 63.

On the end of the tube 56 is a head 64. This head is provided with a T-shaped slot 65 which is in a vertical plane and located across the end of the head. The head is of convex shape and the slot flares out to form diverging plane sides 66. It will be seen that it is entirely independent of a plate 67 which is fixed to the hollow shaft 90. This plate is shown as formed with a groove 68 around it at the rear and with a hook 69. However formed, this hook is concave on the back, as indicated, and it is provided on opposite sides with deep cuts having two walls 70 which are substantially radial and from the opposite outer surfaces of these cuts at the sides of this hook. The curvature of the outside of the plate 67 is continuous with the convex surface of the head 64. It is for the purpose of spreading the loop of the thread so that it will pass over the cone and not get into the T-slot so that the threads will be forced to pass on the opposite side of the slot 65 on the head 64, that the lever 40 is employed.

On the hollow rod 50 is a wheel 72 adapted to engage a fixed cam 73 to pull back both rods 50 and 51 and grip the two ends of the string in the T slot 65. Fixed on the slide 49 is the stud of a cam roll 74 operated by a fixed cam 75 to pull outwardly the parts 45, 67, etc. All the cams are fixed on the platform 10.

Figure 1:
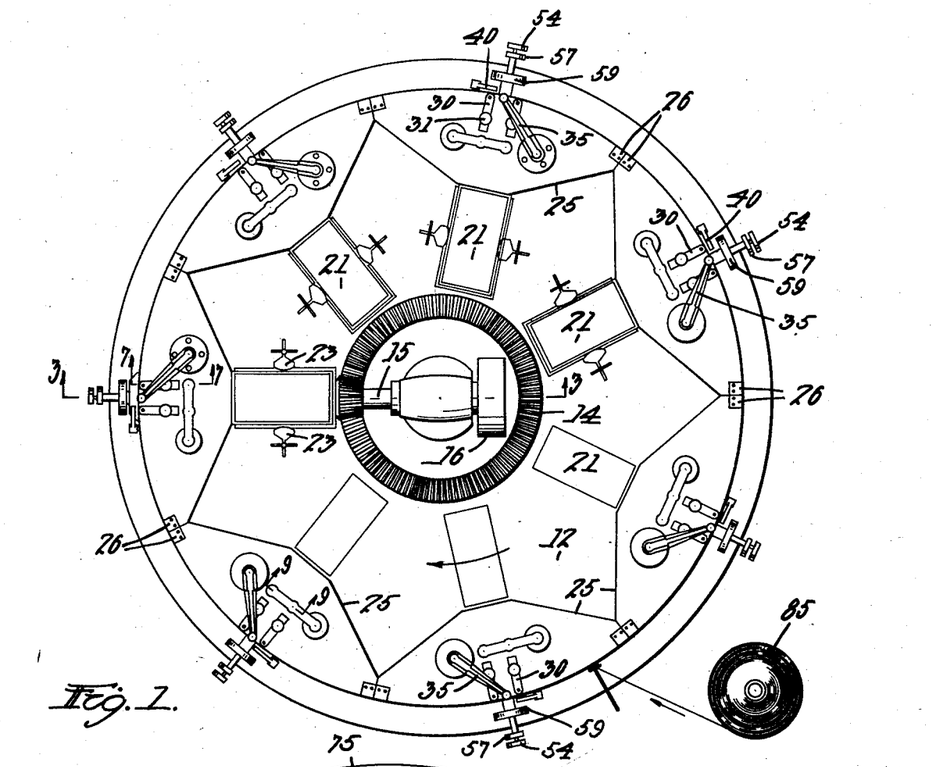
Fig. 1 is a plan of a complete machine constructed in accordance with this invention.
Figure 2:
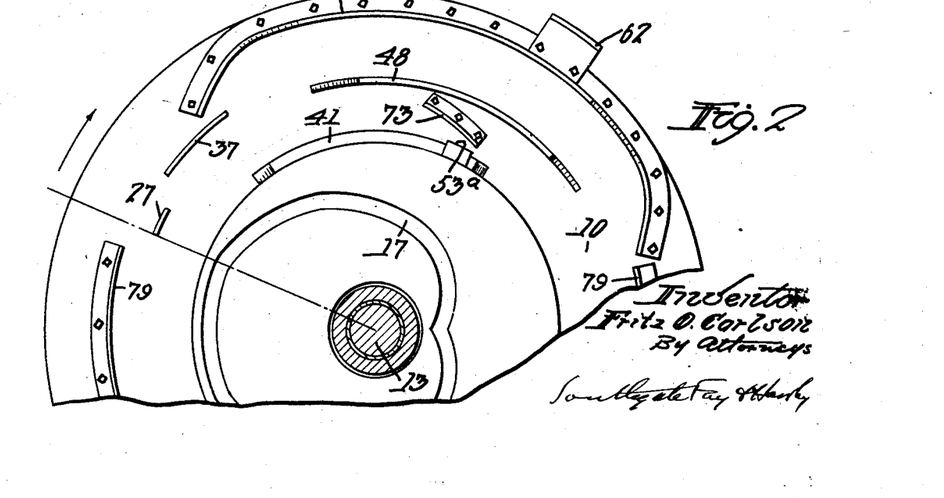
Fig. 2 is a plan of a stationary platform at a lower level than that shown in Fig. 1, illustrating the various cams.
Figures 3, 4, 5:
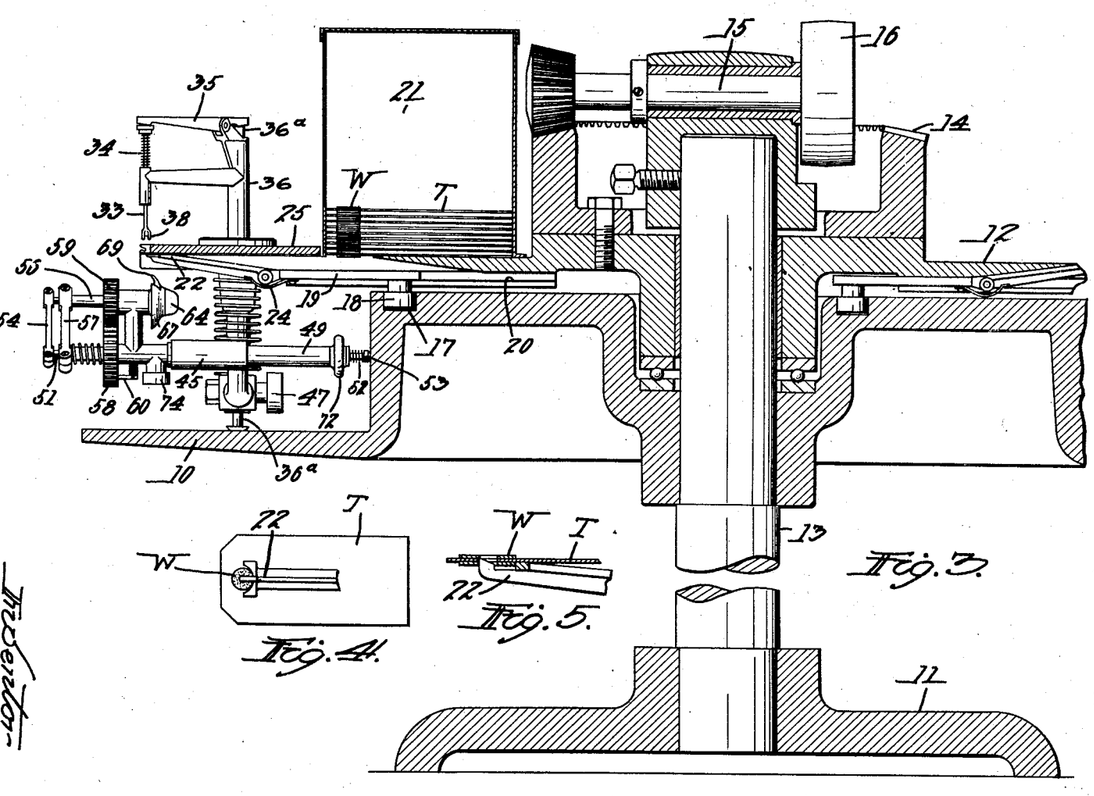
Fig. 3 is a radial sectional view on the line 3—3 of Fig. 1.
Fig. 4 is a bottom plan view of the means for holding the tag and showing the tag in position ready for stringing.
Fig. 5 is an enlarged longitudinal central sectional view of the construction shown in Fig. 4.
Figures 6, 7, 8, 9:
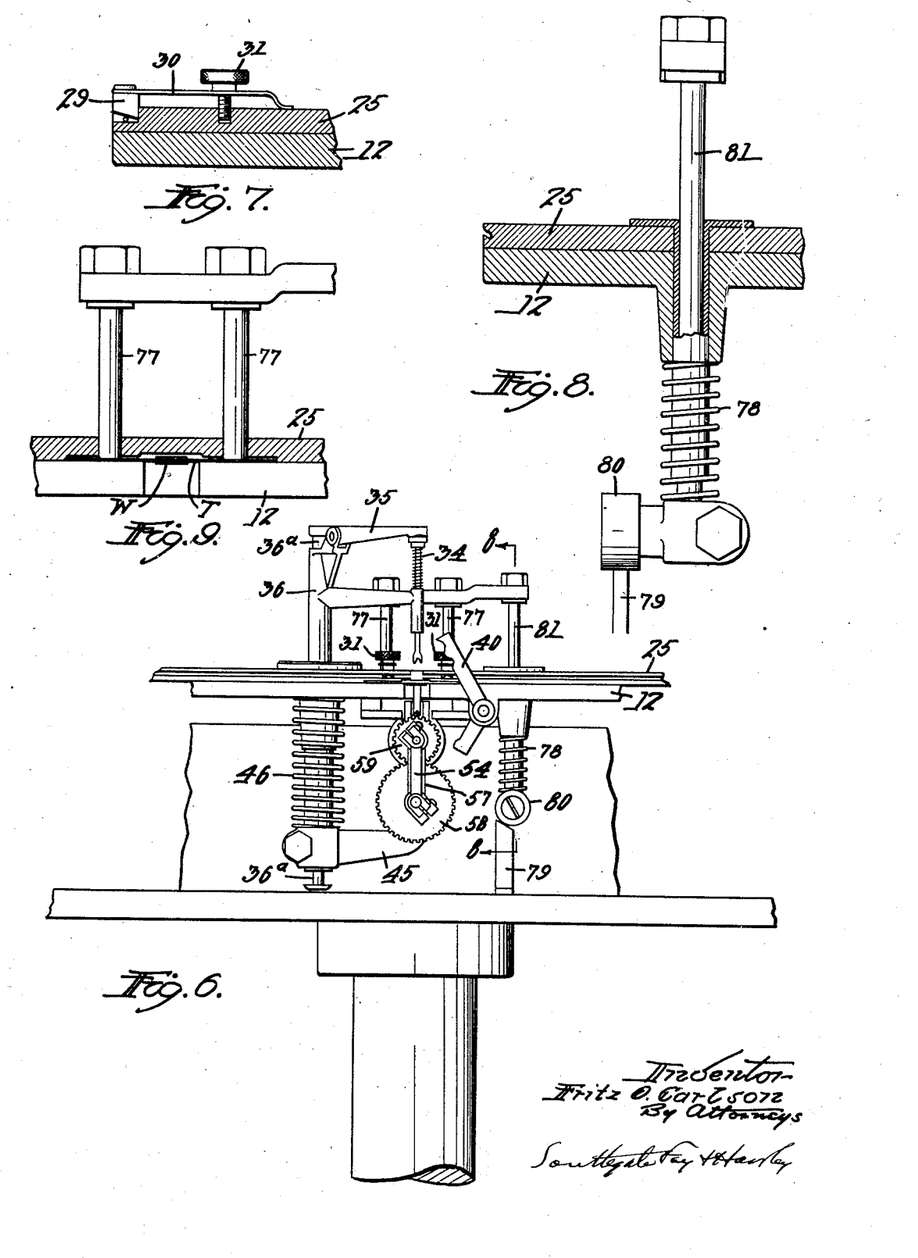
Fig. 6 is an edge view of a part of the machine showing the stringing station in end elevation.
Fig. 7 is a sectional view on the line 7—7 of Fig. 1, showing the means for holding the string.
Fig. 8 is a sectional view on the line 8—8 of Fig. 6.
Fig. 9 is a sectional view on enlarged scale on the line 9—9 of Fig. 1.
Figure 10:
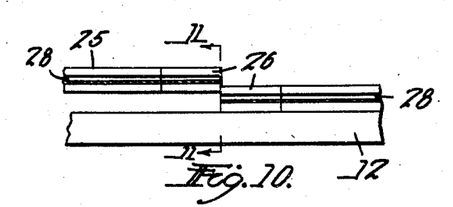
Fig. 10 is an edge view showing the string cutting operation.
Figure 11:
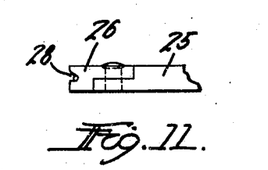
Fig. 11 is a view of the edge of the cutting mechanism, partly in section, on the line 11—11 of Fig. 10.
Figure 16:
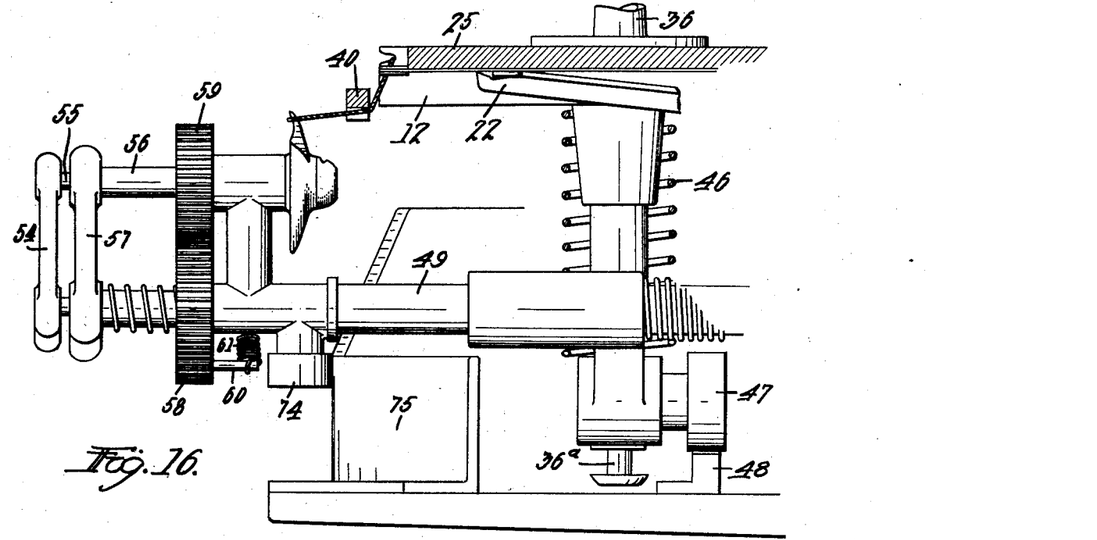
Fig. 16 is a side view of a part of the machine showing the step of drawing the loop outwardly in a radial direction.

The operation of this part of the device is as follows:

When any one of the sections 25 rotates to a certain position the tag T is pushed out to the position shown in Figs. 3 and 5 and below the bodkin 38. The string is originally strung by hand under the clips 29 from a roll 85 and rests in the circumferential groove in the edge of the plates 25. The bodkin 38 descends, taking with it a loop of string, through the eye in the tag, which it pulls against the tension of the clips 29 and to the position shown in Fig. 12. The frame 45 is in its lowermost position. The roll 74 on the slide 49 engages the cam 75 and is pulled out which results in pulling the stringing mechanism to the position shown in Fig. 16. In the meantime the lever 40 descends and spreads this loop below the table, Fig. 14. The bodkin rises. The hook 69 passes through the loop to loop it over this hook. The frame with the plate 25 is now raised by the cam 48 to the position shown in Fig. 17, drawing the loop up around the lever 40 which stays in the same position as in Fig. 16. Here the loop, therefore, will pass over the convex sides of the head 64 and on the curved surface of the plate 67.

Figures 18, 19:
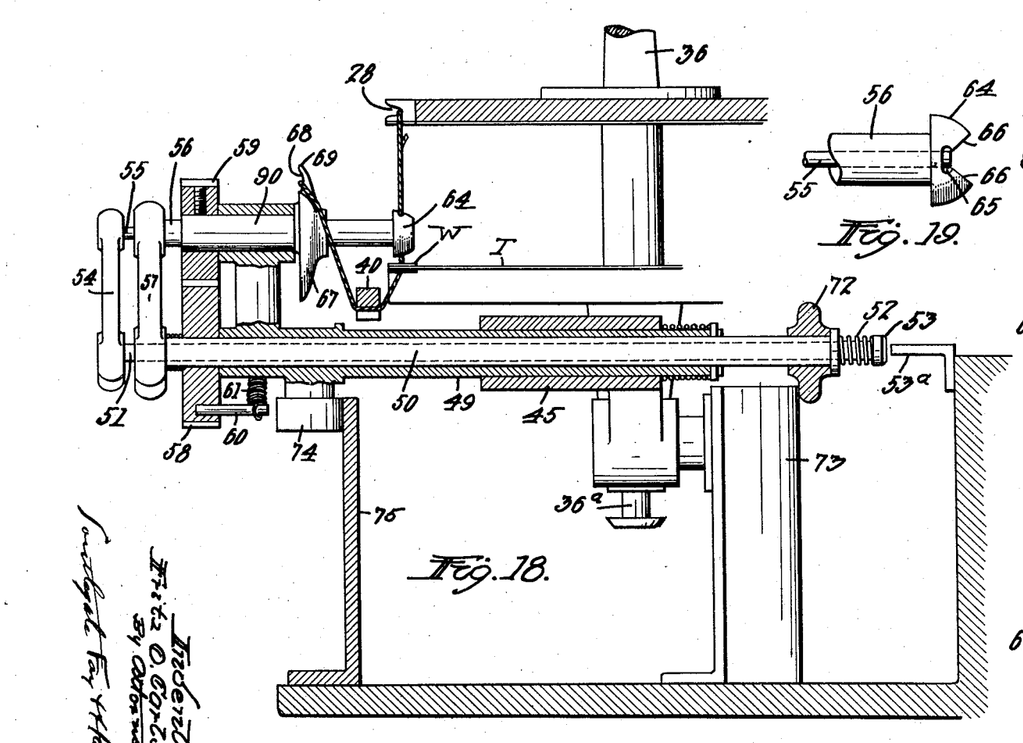
Fig. 18 is a view similar to Fig. 17 but showing some parts in central section and with the parts moved to the position for holding the ends of the string.
Fig. 19 is a plan view of a part of the tag stringing element.
Figures 20, 21, 22:
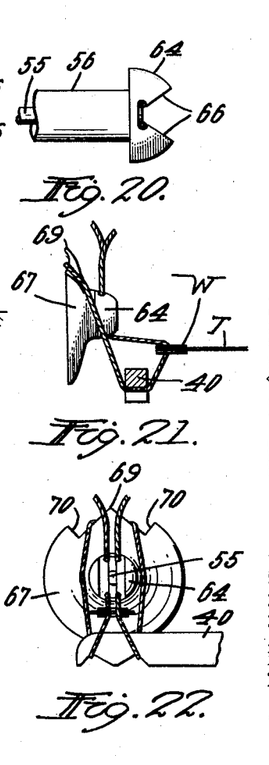
Fig. 20 is a similar view showing another position of the parts.
Fig. 21 is another side view showing the next step after that shown in Fig. 18, which involves the pulling of the loose ends through the loop.
Fig. 22 is an end view of the same.
Figure 23:
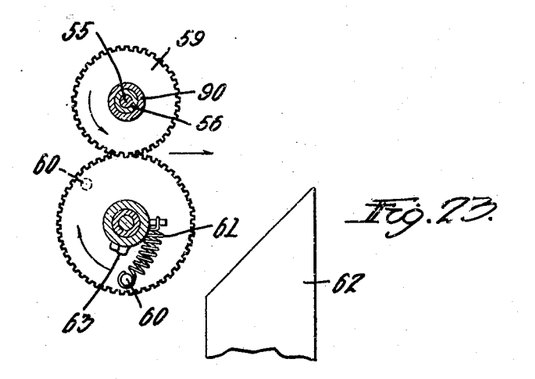
Fig. 23 is an end view, partly in section, showing the operation of certain gears for turning the stringing mechanism.

Now the wheel 72 engages the cam 73 and pulls the shaft 50 back so that the head 64 and the plate 67 separate a little as shown in Fig. 18, but still the loop is held by the hook 69. The head 64 continues to move inwardly until the walls 66 engage both of the ends of the string and bring them into the T slot 65, as shown in Fig. 20. The rod 55 moves outwardly to allow the strings to enter the T slot 65, by means of the head 53 and the rod 51 engaging the cam 53$^a$. The rod 55 then moves in to grip the strings through the action of the spring 52.

Figure 24:
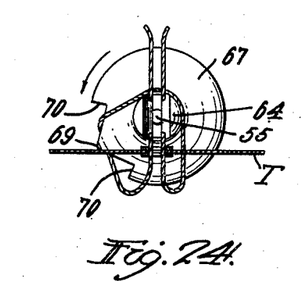
Fig. 24 is an end view similar to Fig. 22 but showing the partial rotation of an element of the tag stringing mechanism for releasing the loop therefrom.
Figure 25:
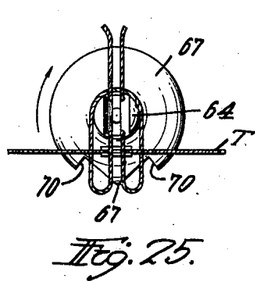
Fig. 25 is a similar view showing the completion of this step.
Figure 26:
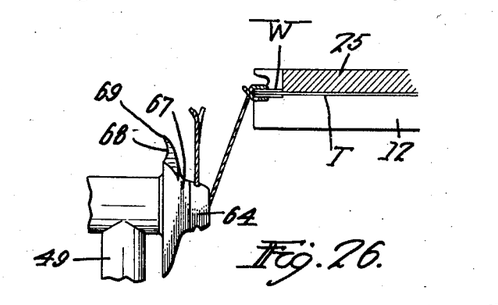
Fig. 26 is a side view of the parts showing the final step, except for the release of the loose ends from the tag stringing device.

Now the pin 60 engages the cam 62 and the gears are turned so that the hollow shaft 90 and the plate 67 turn downwardly toward the front, Fig. 24, and the continuous curved surface of the plate disengages the loop of twine from the hook, Fig. 25, and the string is drawn through forming the usual tying loop for a tag.

The tag with the looped string stays clamped in position by the rods 77 until it comes to the opposite side. Then the roll 80 encounters the cam 79 and the tag is freed. The next tag engages its rear edge and pushes it out of the machine.

It will be seen that by the use of this machine a supply of tags can be placed in the separate hoppers and string supplied from a roll 85 so that the machine will work automatically and continuously to string a large number of tags before it is replenished in either respect. The feeding of the tags into the tag stringing position at one station when the rotary table reaches that point is simple and sure in its operation. The tags are held in place firmly and the looping mechanism is of a simple and effective character. The means for manipulating the loop after it is first formed is of such a nature that the string is not likely to get tangled up and there is nothing to prevent its operating at a high speed.

The looping device of this mechanism constitutes an important advance in this art and it forms uniform loops continuously and yet it is simple in construction and involves no parts on which any great strain is received. The string is cut off to a definite length at each operation, leaving a length of string in position for the next one.

The machine can be made on the same principle by other forms of traveling or even stationary mechanism without departing from the principles set forth herein.

Although I have illustrated and described only one form of the invention I am aware of the fact that modifications can be made therein by any person skilled in the art without departing from the scope of the invention as expressed in the claims.

Therefore, I do not wish to be limited in these respects, but what I do claim is:—

1. In a tag stringing machine, the combination of a stationary platform, with a movable support, a series of tag hoppers carried by said support and movable therewith, means for moving the tags from the hoppers into positions with their perforations exposed, a bodkin movable through the perforation in the tag and means for holding a string in a position below the perforation in the tag so as to be moved into the form of a loop by said bodkin.

2. In a tag stringing machine, the combination of a stationary platform having cams fixed thereon, with a movable support, a series of tag hoppers carried by said support and movable therewith, one after the other, into stringing position, means for moving a tag out of a hopper, a bodkin movable by one of said cams through the perforation in a tag, means for holding a string in position to be moved into the form of a loop by said bodkin, means operated by another of said cams for cutting off the string, and means for moving the support continuously.

3. In a tag stringing machine, the combination with a platform, of a table centrally mounted over said platform, means for rotating the table on a vertical axis, a series of tag hoppers mounted on the table, means rotatable with the table for moving the tags out from their respective hoppers at the bottom, one by one, into exposed position, a reciprocable bodkin carried by the table in front of each hopper, means for reciprocating the bodkin and moving it through a perforation in the tag to form a loop below, means on the edge of the table for carrying a string in position to be moved down by the bodkin, and means carried by the table underneath each bodkin for turning the loop thereafter.

4. In a tag stringing machine, the combination with a platform having a series of stationary cams thereon for operating the parts of the machine, a table mounted over said platform, means for rotating the table, a series of tag hoppers mounted on the table, means rotatable with the table for moving the tags out from their respective hoppers at the bottom, one by one, into exposed position, one of said cams being in position to operate said means at a predetermined time, a reciprocable bodkin in front of a hopper, means operated by one of said cams for reciprocating the bodkin and moving it through a perforation in the tag to form a loop below, means on the edge of the table for carrying a string in position to be moved down by the bodkin, springs on the table for holding the ends of the string frictionally to keep it in place and allow the loop to be formed, means for holding the tag down on the table frictionally, and means carried by the table underneath each bodkin for turning the loop thereafter.

5. In a tag stringing machine, the combination with a support and a tag hopper carried thereby, of a slide carried by the support, a spring pressed arm projecting upwardly from the slide into a position to engage the rear end of the tag in the bottom of the hopper, means for moving the slide outwardly to force the tag out of the hopper and into exposed position, a bodkin, means for moving the bodkin down through the perforation, the support having a groove in its edge for carrying a string in position to be formed into a loop when the bodkin moves down, and means for threading the loop thereafter.

6. In a tag stringing machine, the combination with a support and tag hopper carried thereby, of a slide carried by the support, a spring pressed arm projecting upwardly from the slide into a position to engage the rear end of the tag in the bottom of the hopper, means for moving the slide outwardly to force the tag out of the hopper and into exposed position, means for holding the tag down on the support, a bodkin having means for moving a string into the perforation when so held, means for moving the bodkin down through the perforation, the support having a groove in its edge for carrying the string, a lever arranged in position to engage the loop after it descends, means for operating the lever, said lever having two notches with inclined surfaces for engaging the two strands of the loop and spreading them apart, and means for thereafter threading the ends through the loop to affix it to the tag.

7. In a tag stringing machine, the combination with a support and a tag hopper carried thereby, of a slide carried by the support, means for moving the bottom tag out of the hopper and into exposed position, means for holding the tag down on the support, a bodkin having means for moving a string into the perforation when so held, means for moving the bodkin down through the perforation, the bodkin having a groove in its edge for carrying the string in position to be formed into a loop when the bodkin moves down, the top of said support being formed of a plurality of plates, said plates having cutting edges between them, and means for moving said plates vertically with respect to each other to cut off the string in said groove.

8. In a tag stringing machine, the combination with a support and a tag hopper carried thereby, of means for forcing the bottom tag out of the hopper and into exposed position, the support having a groove in its edge for carrying a string, a bodkin for moving the string into the perforation in the tag and forming a loop as the bodkin moves down, a lever arranged in position to engage the loop after it descends, said lever having two notches with inclined surfaces for engaging the two strands of the loop and spreading them apart, a member below the support having a hook, means for moving said member to hook it into the loop of the string and move it outwardly and upwardly to form a depression in the string between the tag and hook, means for moving the end of the string upwardly on the other side of the lever, means for turning the hook to release the loop therefrom, and means for drawing the ends of the string through the loop.

9. In a tag stringing machine, the combination with means for forming a loop of string through the eye of a tag, of a lever, means for moving the lever into engagement with the loop, a plate having a hook thereon, means for moving the plate in a direction to engage the hook into the loop and bring the loop end into position to project from said lever, means for engaging the opposite ends of the string and pulling them back toward the loop, and means for turning the plate to release the loop end therefrom and thread it over the free ends of the string.

10. In a tag stringing machine, the combination with means for forming a loop of string through the eye of a tag, of a plate having a hook thereon, a lever having notches with converging surfaces, means for moving the lever into engagement with the loop and spreading the two strands apart, means for moving the plate outwardly and upwardly to engage the hook into the loop and bring the loop end into position to project upwardly from said lever, means for engaging the opposite ends of the string and pulling them back through the loop, and means for turning the plate to release the loop end therefrom and thread it over the free ends of the string, and means for then moving the plate downwardly to transfer the looped portion of the string to the end of the tag and draw the string taut.

11. In a tag stringing machine, the combination with means for forming a loop of string through the eye of a tag, of a head having a slot for receiving the two strands of the loop near the free ends, a hook for engaging the looped end of the string, means for moving the hook to bring the loop beyond the T-shaped slot, means for moving the head with its slot inwardly toward the loop end of the string, and means for then turning the hook to release the loop end and move it over the free ends of the string.

12. In a tag stringing machine, the combination with means for forming a loop of string through the eye of a tag, of a rod, a hollow shaft telescopingly mounted on the rod, the rod having a head thereon having a T-shaped slot for receiving and holding the two strands of the loop near the free ends, a plate on the hollow shaft having a hook thereon for engaging the looped end of the string, means for moving the plate to bring the loop up above the T-shaped slot, means for moving the head with its slot inwardly toward the plate and means for then turning the plate to release the loop end and move it over the free ends of the string.

13. In a tag stringing device, the combination with means for forming a loop of string through the eye of a tag, with an oscillatable plate having a hook and slanting surfaces extending therefrom, said plate having a general circular shape, a head concentric with the plate and having a T-shaped slot for receiving the free ends of the string, means for moving the plate to bring the hook into the loop end of the tag, means for moving the head away from the plate to engage the free ends of the string and then moving it back and means for then turning the plate to release the loop from the hook and string the ends through the loop.

14. In a tag stringing machine, the combination with a plate mounted to oscillate, means for periodically oscillating the plate, a head concentric with the plate and having a T-shaped slot for receiving the free ends of the string, and means for moving the head back and forth to engage the string in the slot and move the free ends into the loop of the string when the shaft turns to disengage the loop from the hook.

15. In a tag stringing machine, the combination with a hollow shaft mounted to oscillate, means for periodically oscillating the shaft, said shaft having a plate thereon of general circular shape, and a hook, a rod extending through the shaft and having a head thereon provided with a T slot for receiving the two free ends of the string and means for moving the rod back and forth to engage the string in the slot and move the free ends into the loop of the string when the shaft turns to disengage the loop from the hook.

16. In a tag stringing device, the combination with means for forming a loop of string through the eye of a tag, with an oscillatable plate having a hook, said plate having a general circular shape, a head concentric with the plate and having a T-shaped slot for receiving the free ends of the string, means for moving the plate to bring the hook into the loop end of the tag and raising it above the tag, means for holding the string down between the tag and hook, means for moving the head away from the plate to engage the free ends of the string and then moving it back to the plate and means for then turning the plate to release the loop from the hook and string the ends through the loop.

17. In a tag stringing device, the combination with a circular oscillatable plate having a flat end with a convex surface behind it and a hook for engaging the loop of a string, of a head concentric therewith and having a convex surface continuous with the surface of the plate when in contact therewith and movable axially, having a T slot for receiving the two free ends of the loop.

18. In a tag stringing device, the combination with a circular oscillatable plate having a hook for engaging the loop of a string, of a head concentric therewith and movable axially, having a T slot for receiving the two free ends of the loop.

19. In a tag stringing device, the combination with a rod and a hollow shaft thereon, means for oscillating the shaft, and means for reciprocating the rod in a certain order, of a circular plate having a hook on its edge mounted on the shaft and a head having an external convex surface continuous with the surface of the plate when they are in contact and having two slots for receiving the free ends of the string, and means for holding the ends in the slots.

In testimony whereof I have hereunto affixed my signature.

FRITZ O. CARLSON.